No. 821,041. PATENTED MAY 22, 1906.
R. P. KINNEY.
REPAIR PLUG FOR PNEUMATIC TIRES.
APPLICATION FILED OCT. 20, 1905.

WITNESSES:
G. W. Saywell
Jno. F. Oberlin

INVENTOR:
Ralph P. Kinney
by his attorney
J. B. Fay.

UNITED STATES PATENT OFFICE.

RALPH P. KINNEY, OF CLEVELAND, OHIO.

REPAIR-PLUG FOR PNEUMATIC TIRES.

No. 821,041.  Specification of Letters Patent.  Patented May 22, 1906.

Application filed October 20, 1905. Serial No. 283,586.

*To all whom it may concern:*

Be it known that I, RALPH P. KINNEY, a citizen of the United States, and a resident of Cleveland, county of Cuyahoga, and State of Ohio, have invented a new and useful Improvement in Devices for Repairing Pneumatic Tires, of which the following is a specification, the principle of the invention being herein explained and the best mode in which I have contemplated applying that principle, so as to distinguish it from other inventions.

My invention relates to devices for repairing pneumatic tires, and particularly such tires as involve the use of an outer shoe and an inner tube, the object of said invention being to provide a cheap, ready, and effective means for stopping punctures in such inner tubes.

The said invention consists of means hereinafter fully described, and particularly set forth in the claims.

The annexed drawings and the following description set forth in detail certain mechanism embodying the invention, such disclosed means constituting but one of the various mechanical forms in which the principle of the invention may be used.

Figure 1:
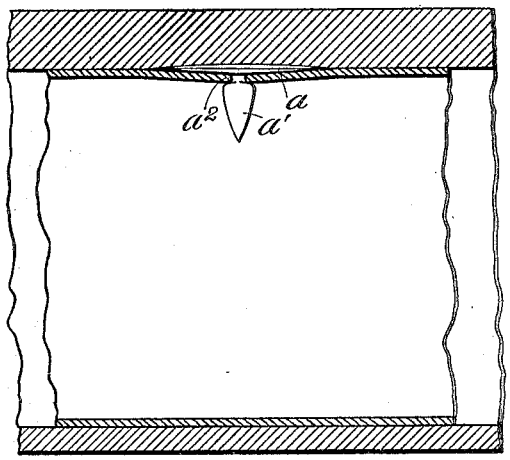
Figure 2:
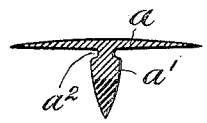
Figure 3:
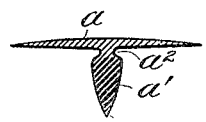

In said annexed drawings, Figure 1 represents a longitudinal section of a portion of an automobile-tire, showing a repair-plug in elevation embodying my invention and applied thereto. Fig. 2 represents an axial section of such plug, and Fig. 3 represents a similar section of a slightly-modified form of such plug.

Each plug consists of a thin disk or flange $a$ of soft rubber, having a flat under surface and a tapered or beveled edge, which gives it a semilenticular form and is provided with a centrally-located integral projecting stem or nipple $a'$ of a permanent tapering or conical form, as shown. At or near the junction of said nipple and the disk the diameter of the former is reduced to form a circumferential groove $a^2$ of a width substantially equal to the thickness of the inner tube, such groove being, however, a little narrower at the bottom than at the top, so as to insure a tight fit with the edge of the aperture in the tire. That portion of the nipple intermediate of its outer extremity and said groove is consequently substantially pyriform in outline, and the extreme outer end portion is made of rubber of substantially greater hardness than that of the disk $a$, as is indicated by the heavier shading in Fig. 2.

The above-described device is applied as follows: When the tire sustains a puncture, such as includes the inner tube, the outer shoe is removed, so as to uncover the perforation in such tube. The nipple $a'$ of a plug is now inserted in the perforation and pushed through until the inner tube snaps into the groove $a^2$. The increased hardness of the end of the nipple greatly facilitates such insertion. In such position the flange or disk fits down closely to the outer surface of the inner tube and is held securely in position. The shoe now being replaced, the tire is inflated, and the flange is now located between the shoe and tube and is squeezed tightly over the puncture and upon the inner-tube surface surrounding same. Under these conditions the puncture is effectually healed. By giving the flange or disk a semilenticular form or beveling its edge the shoe may readily slide over it, the liability of displacement of the plug by reason of the "creeping" of the shoe is obviated, and the plug is therefore allowed to remain securely in place at all times.

A suitable cement may, if desired, be used in connection with the plug and applied to such part of its surface as comes into contact with the inner tube, as will be readily understood. It is not, however, necessary to use a cement to make an air-tight puncture repair, and by not using such cement the plug may be used several times, since such use renders the plug liable to injury during its removal. The use of the plug without cement is therefore very advantageous from an economical standpoint.

In the modified form of plug shown in Fig. 3 a greater part of the nipple is made of hard rubber than in the case of the plug illustrated in Fig. 2; but its function and application are the same as above described.

Having thus described my invention in detail, that which I particularly point out and distinctly claim is—

1. As a new article of manufacture, a tire-repairing device comprising a disk of suitable material having a flat under surface, and provided with a pyriform nipple projecting therefrom.

2. As a new article of manufacture, a tire-repairing device comprising a disk of suitable material having a flat under surface, and provided with an integral pyriform nipple projecting therefrom.

3. As a new article of manufacture, a tire-repairing device comprising a flange of elastic material formed with a projecting nipple integral with and of greater degree of hardness than said flange.

4. As a new article of manufacture, a tire-repairing device comprising a circular flange of rubber or other elastic material and a nipple integral with said flange, the said nipple being constructed of comparatively harder material than that of said flange.

5. As a new article of manufacture, a tire-repairing device comprising a semilenticular flange of rubber provided with a projecting nipple integral therewith, said nipple formed with a groove adjacent to its junction with said flange.

6. As a new article of manufacture, a tire-repairing device comprising a rubber flange formed with a tapered nipple of comparatively harder material.

7. As a new article of manufacture, a tire-repairing device comprising a soft-rubber flange provided with an integral hard-rubber nipple projecting from said flange.

8. As a new article of manufacture, a tire-repairing device comprising a soft-rubber flange provided with an integral hard-rubber tapered nipple projecting from said flange.

9. As a new article of manufacture, a tire-repairing device comprising a flange of soft rubber or similar elastic material having a flat under surface and a tapered edge, and provided with a nipple of a material harder than that of said flange.

10. The combination of an outer shoe, a perforated inner tube, and a plug comprising a semilenticular flange provided with a nipple projecting therefrom; said nipple passing through such perforation and formed with a circumferential groove adjacent to its junction with said flange, the latter being located between said shoe and tube.

11. As a new article of manufacture, a tire-repairing device comprising a semilenticular flange of rubber or similar material provided with a tapered nipple integral therewith and projecting therefrom and formed with a groove adjacent to its junction with said flange, said nipple being made of material harder than that of said flange.

12. As a new article of manufacture, a tire-repairing device comprising a disk of rubber or similar material, having a flat under surface, and provided with a tapering nipple integral therewith, the diameter of said nipple being reduced at or near its junction with said disk to form a circumferential groove of greater width at its top than at its bottom.

13. As a new article of manufacture, a tire-repairing device comprising a disk of rubber or similar material, having a flat under surface, and provided with a nipple centrally located thereon, the diameter of said nipple being reduced at or near its junction with said disk to form a circumferential groove and the remaining portion thereof being substantially pyriform.

14. As a new article of manufacture, a tire-repairing device comprising a disk of rubber or similar material, having a flat under surface, and provided with a nipple centrally located thereon, the diameter of said nipple being reduced at or near its junction with said disk to form a circumferential groove, the remaining portion thereof being substantially pyriform and of greater hardness than said disk.

15. As a new article of manufacture, a tire-repairing device comprising a disk of rubber or similar material, having a flat under surface, and provided with a tapering nipple of greater hardness than said disk and integral therewith, the diameter of said nipple being reduced at or near its junction with said disk to form a circumferential groove of greater width at its top than at its bottom.

Signed by me this 10th day of October, 1905.

RALPH P. KINNEY.

Attest:
   J. H. WOLF,
   G. W. HILTON.